(12) United States Patent
Wang

(10) Patent No.: US 6,817,773 B2
(45) Date of Patent: Nov. 16, 2004

(54) BICYCLE HUB ASSEMBLY

(76) Inventor: Ching-Fen Wang, No. 293, Guangfu Lane, Guangfu Rd., Taichung (TW)

( * ) Notice: Subject to any disclaimer, the term of this patent is extended or adjusted under 35 U.S.C. 154(b) by 96 days.

(21) Appl. No.: 10/366,573

(22) Filed: Feb. 14, 2003

(65) Prior Publication Data

US 2004/0161184 A1 Aug. 19, 2004

(51) Int. Cl.[7] ............................................... F16C 19/08
(52) U.S. Cl. ....................................................... 384/545
(58) Field of Search ................................ 384/545, 540, 384/544, 589, 584

(56) References Cited

U.S. PATENT DOCUMENTS 5,338,142 A * 8/1994 Gonzales .................... 411/402
5,597,242 A * 1/1997 Beeler ........................ 384/517

* cited by examiner

Primary Examiner—Lenard A. Footland
(74) Attorney, Agent, or Firm—Rosenberg, Klein & Lee

(57) ABSTRACT

A bicycle hub assembly includes a casing with an axle extending through a passage defined through the casing. A stepped shoulder extends inward from an inner periphery of the passage and a first bearing is mounted to the axle and engaged with a first open end of the casing. A base member is mounted to the axle an end of the base member contacts against the stepped shoulder. Two sets of beads are respectively engaged with two grooves defined in an inner periphery of the base member and two retaining rings are respectively engaged with two open ends of the base member to restrain longitudinal movement of the beads. Two nuts are respectively threadedly connected to the axle and positioning the two retaining rings.

2 Claims, 4 Drawing Sheets

BICYCLE HUB ASSEMBLY

FIELD OF THE INVENTION

The present invention relates to a bicycle hub assembly that has two sets of bearing at one end which is connected to a sprocket so as to prolong the life of use of the hub assembly.

BACKGROUND OF THE INVENTION

A conventional bicycle hub assembly is shown in FIG. 4 and generally includes a casing 1 with an axle 2 extending therethrough and two sets of bearing 5, 50 are respectively received in two ends of the casing 1 so that the axle 2 can be rotated independently. One end of the casing 1 is cooperated with a sprocket 3 which is fixed to a connection member 4. In order to cooperated with the connection member 4, the casing 1 has one large open end for receiving the bearing 50 and the other is a small open end with which the connection member 4 and the bearing 5 can be engaged. It is to be noted that the bearing 50 includes larger beads 500 and the bearing 5 can only equipped with smaller beads 6 because the bearing 5 is mounted on the connection member 4. The smaller beads 6 cannot be used for a long period of time because of the load and friction. Therefore, the bearing 5 is damaged earlier than the bearing 50.

The present invention intends to provide a bicycle hub assembly wherein there are two sets of bearing mounted on the connection member.

SUMMARY OF THE INVENTION

In accordance with one aspect of the present invention, there is provided a bicycle hub assembly which comprises a casing having two flanges extending outward from two ends thereof and a passage is defined through the casing so that an axle extends through the passage. An stepped shoulder extends inward from an inner periphery of the passage and a first bearing is mounted to the axle and engaged with a first open end of the casing.

A base member is mounted to the axle and located close to a second open end. An end of the base member contacts against the stepped shoulder and two sets of beads are respectively engaged with two grooves defined in an inner periphery of a longitudinal through hole in the base member. Two retaining rings are respectively engaged with two open ends of the base member to restrain longitudinal movement of the beads. Two nuts are respectively threadedly connected to the axle and positioning the two retaining rings.

The primary object of the present invention is to provide a bicycle hub assembly wherein the end connected with the sprocket of the casing includes two sets of beads so that the beads can be used for a long period of time.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
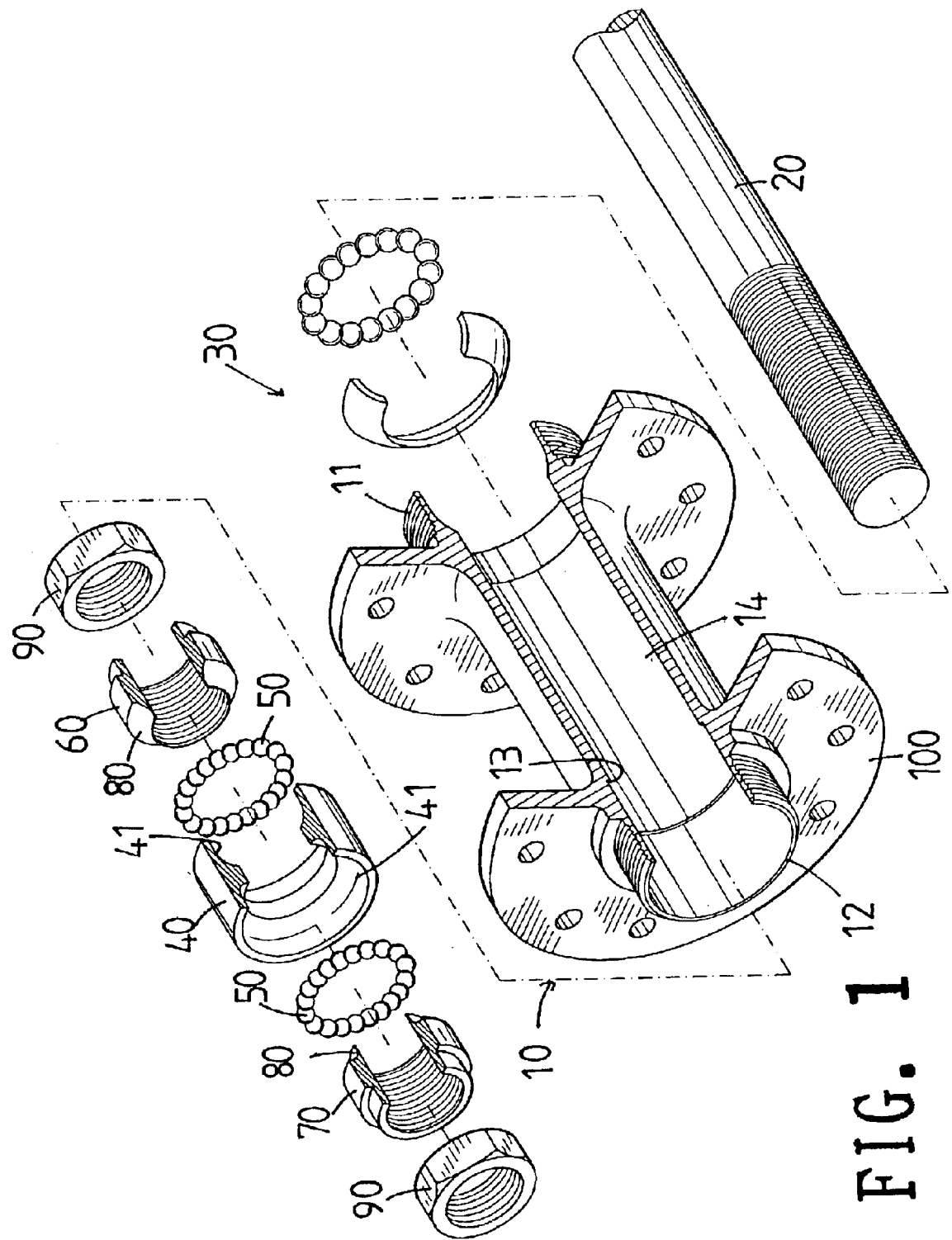
FIG. 1 is an exploded view to show the bicycle hub assembly of the present invention.
Figure 2:
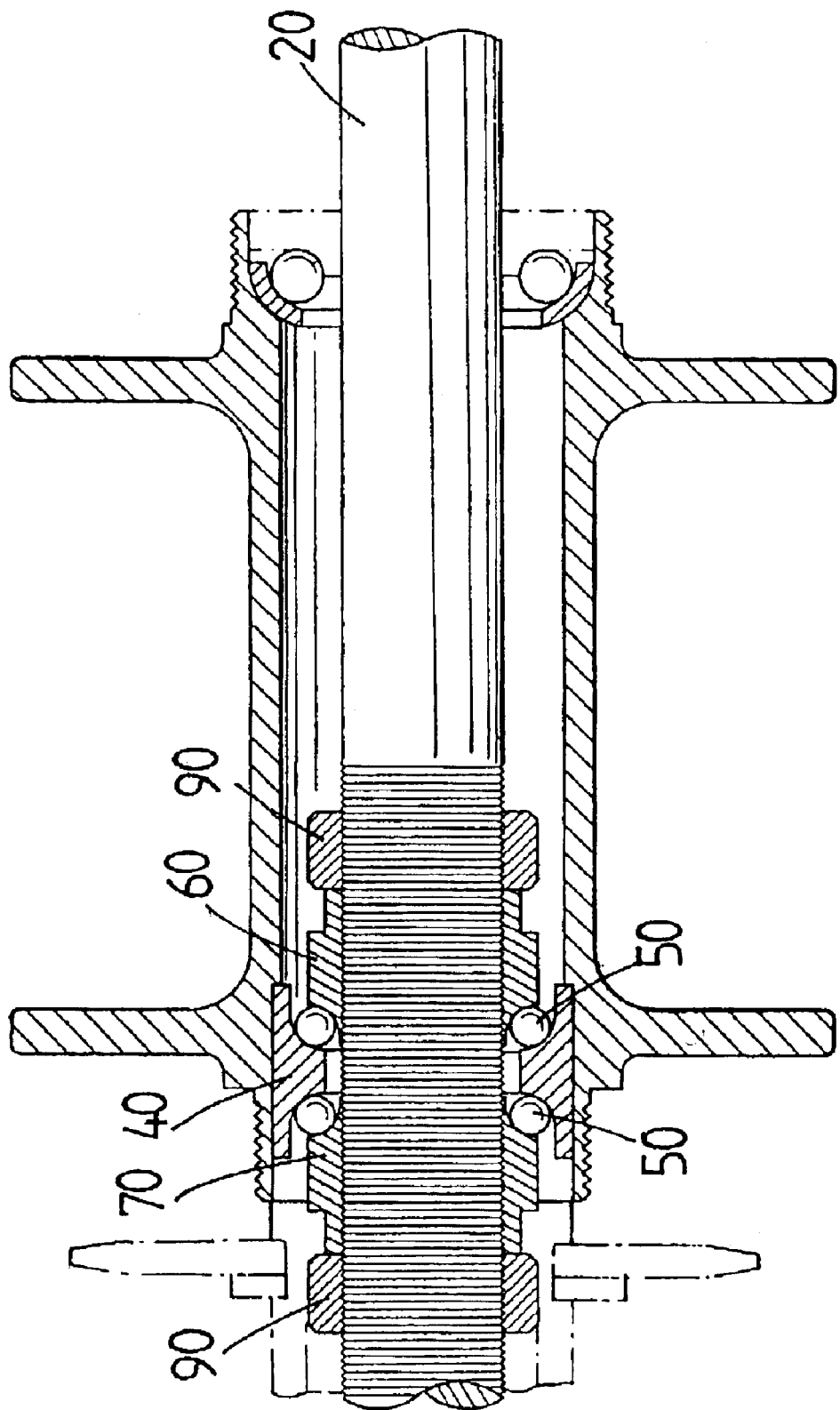
FIG. 2 is a cross sectional view to show the bicycle hub assembly of the present invention.
Figure 3:
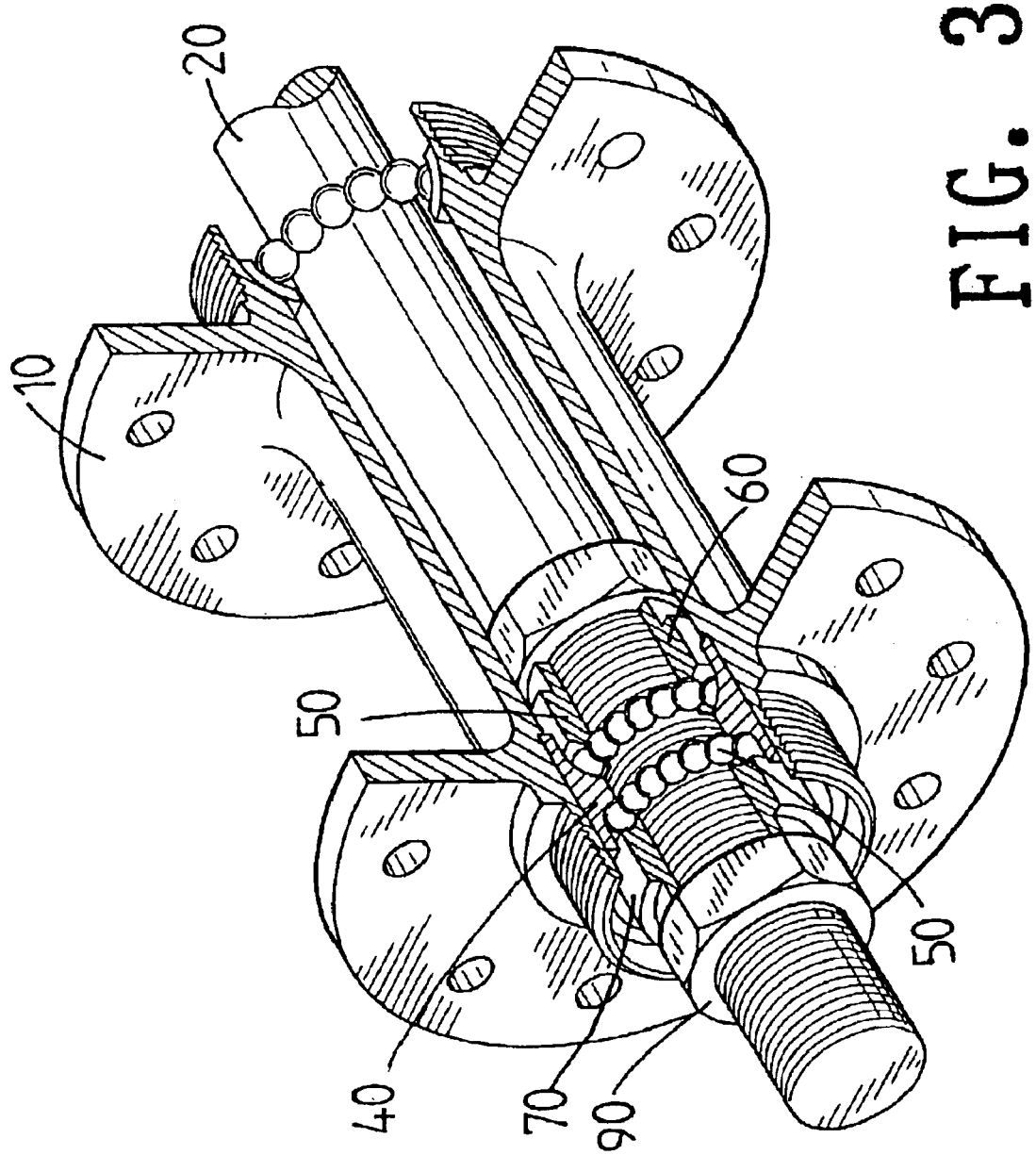
FIG. 3 is a perspective view, partly removed, to show the bicycle hub assembly of the present invention.
Figure 4:
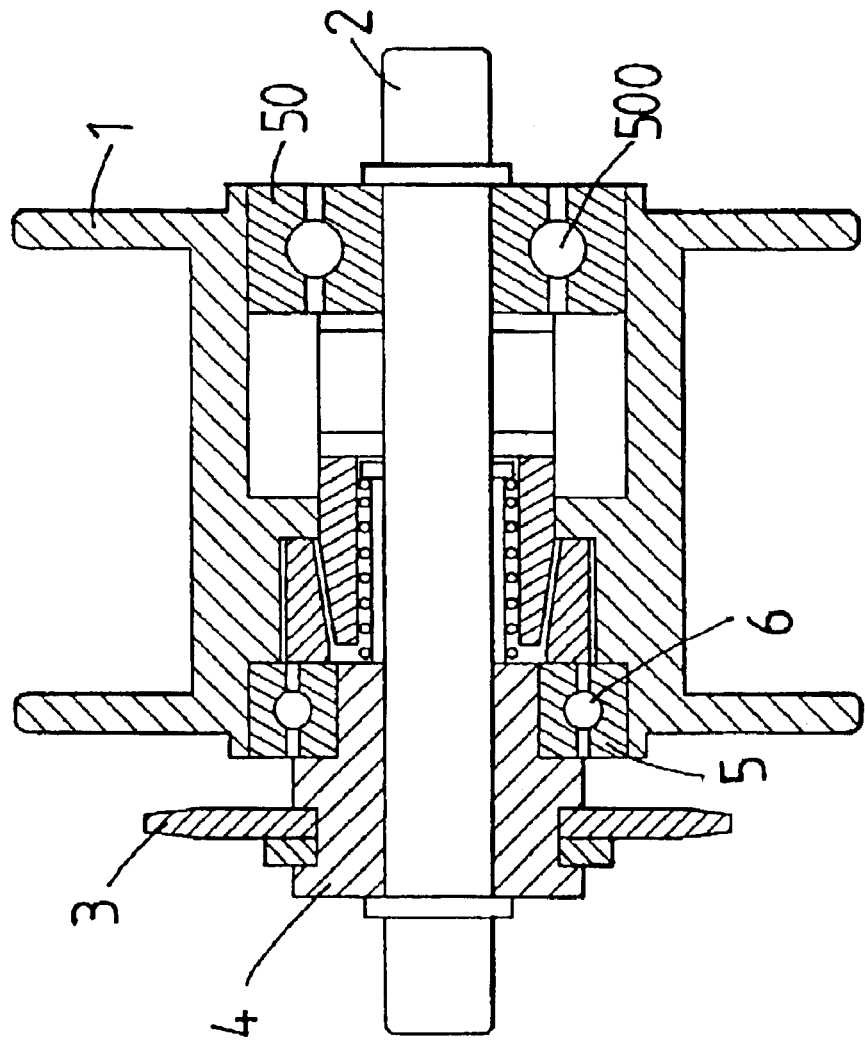
FIG. 4 is a cross sectional view to show a conventional bicycle hub assembly.

Referring to FIGS. 1 to 3, the bicycle hub assembly of the present invention comprises a casing 10 which has two flanges 100 extending outward from two ends thereof and holes are defined through each flange 100 so as to be connected with wheel spokes. A passage 14 is defined through the casing 10 and a stepped shoulder 13 extends inward from an inner periphery of the passage 14. An axle 20 extends through the passage 14 and a first bearing 30 is mounted to the axle 20 and engaged with a first open end 11 of the casing 10.

A base member 40 is mounted to the axle 20 and located close to second open end 12 of the casing 10. An end of the base member 40 contacts against the stepped shoulder 13. The base member 40 has a longitudinal through hole and two grooves 41 are defined in an inner periphery of the longitudinal through hole. Two sets of beads 50 are respectively engaged with the grooves 41 and two retaining rings 60, 70 are respectively threadedly mounted to a threaded section of the axle 20 and are engaged with two open ends of the base member 40 to restrain longitudinal movement of the beads 50. Each retaining ring 60/70 has an annular lip 80 which has a curved surface with which the beads 50 are engaged. Two nuts 90 respectively threadedly connected to the axle 20 and position the two retaining rings 60, 70.

The connection member with a sprocket can be connected to the second end of the casing 10 and because of the two sets of beads 50, the hub assembly can be used for a longer period of time. The thickness of the wall of the base member 40 may also be thinner so that the diameter of the beads 50 can be larger.

While we have shown and described the embodiment in accordance with the present invention, it should be clear to those skilled in the art that further embodiments may be made without departing from the scope of the present invention.

What is claimed is:

1. A bicycle hub assembly comprising:

a casing having two flanges extending outward from two ends thereof and a passage defined through the casing, a stepped shoulder extending inward from an inner periphery of the passage, an axle extending through the passage and a first bearing mounted to the axle and engaged with a first open end of the casing, and a base member mounted to the axle and located close to a second open end, an end of the race member contacting against the stepped shoulder, the race member having a longitudinal through hole and two grooves defined in an inner periphery of the longitudinal through hole, two sets of balls respectively engaged with the grooves and two retaining rings respectively engaged with two open ends of the base member to restrain longitudinal movement of the beads, two nuts respectively threadedly connected to the axle and positioning the two retaining rings.

2. The hub assembly as claimed in claim 1, wherein the two retaining rings are threadedly mounted to a threaded section on the axle.

\* \* \* \* \*